(12) United States Patent
Noritake et al.

(10) Patent No.: US 6,621,540 B2
(45) Date of Patent: Sep. 16, 2003

(54) REFLECTION TYPE LIQUID CRYSTAL DISPLAY

(75) Inventors: Kazuto Noritake, Gifu (JP); Shinji Ogawa, Ohgaki (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 09/421,183

(22) Filed: Oct. 19, 1999

(65) Prior Publication Data
US 2003/0137623 A1 Jul. 24, 2003

(30) Foreign Application Priority Data
Oct. 20, 1998 (JP) ............................................ 10-298445

(51) Int. Cl.$^7$ ............................................ G02F 1/1335
(52) U.S. Cl. ........................ 349/113; 349/122; 349/138
(58) Field of Search ................... 349/113, 138, 349/122, 42, 44, 43, 110

(56) References Cited

U.S. PATENT DOCUMENTS

| | | | |
|---|---|---|---|
| 3,862,360 A | 1/1975 | Dill et al. | |
| 4,239,346 A | * 12/1980 | Lloyd | 349/44 |
| 4,431,272 A | 2/1984 | Yazawa et al. | |
| 4,519,678 A | * 5/1985 | Komatsubara et al. | 349/113 |
| 4,648,691 A | 3/1987 | Oguchi et al. | |
| 5,327,268 A | * 7/1994 | Takabatake et al. | 349/42 |
| 5,407,845 A | 4/1995 | Nasu et al. | |
| 5,548,425 A | * 8/1996 | Adachi et al. | 349/112 |
| 5,691,791 A | 11/1997 | Nakamura et al. | |
| 5,793,457 A | 8/1998 | Tamai et al. | |
| 5,796,455 A | 8/1998 | Mizobata et al. | |
| 5,805,252 A | 9/1998 | Shimada et al. | |
| 5,847,789 A | 12/1998 | Nakamura et al. | |
| 5,877,832 A | 3/1999 | Shimada | |
| 5,880,797 A | 3/1999 | Yamada et al. | |
| 6,037,084 A | 3/2000 | Ting et al. | |
| 6,061,111 A | * 5/2000 | Kataoka et al. | 349/113 |
| 6,091,470 A | 7/2000 | Fujikawa et al. | |
| 6,162,654 A | 12/2000 | Kawabe | |
| 6,163,405 A | 12/2000 | Chang et al. | |
| 6,184,949 B1 | * 2/2001 | Cornelissen et al. | 349/64 |
| 6,262,783 B1 | 7/2001 | Tsuda et al. | |
| 6,300,152 B1 | 10/2001 | Kim | |
| 6,313,898 B1 | 11/2001 | Numano et al. | |
| 6,326,129 B1 | 12/2001 | Hirose et al. | |
| 6,342,935 B1 | 1/2002 | Jang et al. | |
| 6,348,960 B1 | 2/2002 | Etori et al. | |

FOREIGN PATENT DOCUMENTS

| | | |
|---|---|---|
| EP | 0 112 417 A1 | 7/1984 |
| EP | 0 883 015 A | 12/1998 |
| EP | 0 886 169 A | 12/1998 |
| EP | 0 996 026 A | 4/2000 |
| JP | 57-49983 | 3/1982 |
| JP | 6-23099 | 8/1994 |
| JP | 6-294954 | 10/1994 |
| JP | 06 294954 A | 10/1994 |
| JP | 7-318974 | 12/1995 |
| JP | 09 179127 A | 7/1997 |
| JP | 11-52402 | 2/1999 |

* cited by examiner

*Primary Examiner*—Robert H. Kim
*Assistant Examiner*—David Chung
(74) *Attorney, Agent, or Firm*—Cantor Colburn LLP

(57) ABSTRACT

A reflection type liquid crystal display comprises a substrate (10) provided with a TFT and a reflective display electrode (50) connected to the TFT, a counter electrode substrate (30) having a color filter (31), and a counter electrode (34), and provided with a light diffusing layer (43), a phase plate (44) and a polarizer (45) on the side of an observer 101, and a liquid crystal (21) held between the substrates. The surface of the reflective display electrode (50) facing the liquid crystal (21) is concaved toward the substrate (10), so that a reflected light is prevented from leaking to adjacent pixels, and prevented from being radiated to a black matrix in the vicinity of the pixels. A bright display can be obtained a wide viewing angle.

28 Claims, 6 Drawing Sheets

REFLECTION TYPE LIQUID CRYSTAL DISPLAY

BACKGROUND OF THE INVENTION

1. Field of the Invention

The present invention relates to a reflection type liquid crystal display.

2. Description of the Related Art

A number of reflection type liquid crystal displays that create a recognizable image by reflecting incident light originating from the observer's side have been proposed to date.

FIG. 1 is a sectional view of one such conventional reflection type liquid crystal display.

As shown in FIG. 1, such a conventional reflection type liquid crystal display has a thin film transistor (hereinafter referred to as the TFT) as a switching element on an insulating substrate 10 of quartz glass or non-alkali glass or the like.

First, gate electrodes 11 of a refractory metal, such as chromium (Cr) or molybdenum (Mo), a gate insulating film 12, and active layers 13 of polysilicon films are successively formed on the insulating substrate (TFT substrate) 10.

Each active layer 13 includes channels 13c formed above the gate electrodes 11, and a source 13s and a drain 13d that are formed on both sides of the channels 13c by ion doping using stopper insulating films 14 on the channels 13c as masks.

Then, an inter-layer insulating film 15, which includes a $SiO_2$ film, a SiN film and a $SiO_2$ film deposited in succession, is formed over the entire surfaces of the gate insulating film 12, the active layer 13 and the stopper insulating films 14. A drain electrode 16 is formed by filling a contact hole, which is formed to correspond to the drain 13d, with a metal, such as aluminum (Al). Furthermore, a planarization insulating film 17, which consists of an organic resin, for example, and serves to flatten the surface, is formed over the entire surface. A contact hole is formed at a location of the planarization insulating film 17 corresponding to the source 13s. A reflective display electrode 19 as a reflection electrode, which consists of aluminum (Al) in contact with the source 13s through this contact hole and serves also as the source electrode 18, is formed on the planarization insulating film 17. An alignment film 20 consisting of an organic resin, such as polyimide, and aligning liquid crystal elements 21, is formed on the reflective display electrode 19.

On a counter electrode substrate 30 facing the TFT substrate 10 and comprising an insulating substrate, are provided a color filter 31 including primary colors, red (R), green (G), and blue (B) and a black matrix 32 with a function to shield light; a protective film 33 of a resin formed on the color filter 31; and a counter electrode 34 and an alignment film 35 formed over the entire surface of the protective film 33. On the side not facing the TFT substrate 10, a polarizer 41 is located. The counter electrode substrate 30 and the TFT substrate 10 are bonded together with their peripheries sealed with a sealing bond (not shown), thus forming a space inside, and this space is filled with a twisted nematic (TN) liquid crystal 21.

The propagation of light when a user views the reflection type liquid crystal display as above is described below with reference to FIG. 1.

As indicated by a broken line, a natural light 100 coming from the outside enters from the polarizer 41 on the side of an observer 101, and passes through the counter electrode substrate 30, the color filter 31, the protective film 33, the counter electrode 34, the alignment film 35, the alignment film 20, the TN liquid crystal 21, and the alignment film 20 on the TFT substrate 10. The light is reflected by the reflective display electrode 19, travels through the layers in a direction opposite to the direction of incidence, emerges from the polarizer 41 on the counter electrode substrate 30 and enters the eyes of the observer 101.

However, when, as indicated by broken line 102, the incident natural light advances linearly and is reflected by the reflective display electrode 19 of the reflective material, the reflected light travels linearly and in parallel with the light 100. Therefore, a part of the light 102 travelling linearly in parallel travels through a place not related with a display, such as the black matrix 32 of the color filter 31.

Therefore, when the display is observed, the observed display in a specific viewing angle can be bright by the light having passed through a place other than the place not related with the display, but the entire observed image is disadvantageously dark. Moreover, as another disadvantage, an image blur, or a bleeding of a color image tends to be easily generated because the light of a pixel to be displayed is emitted from other pixels in the vicinity as shown in FIG. 1.

SUMMARY OF THE INVENTION

The present invention has been made to rectify the disadvantages described above and has as its object to provide a reflection type liquid crystal display that enhances a luminance of each display pixel and offers a high-quality display.

According to one aspect of the present invention, there is provided a reflection type liquid crystal display, which comprises a liquid crystal held in a gap between a first substrate and a second substrate disposed facing each other, and electrodes for driving the liquid crystal for each pixel disposed on the first and second substrates facing the liquid crystal. The electrode on the first substrate comprises a plurality of reflective display electrodes divided for the pixels and formed of conductive reflective materials, and each of the plurality of reflective display electrodes has a concavity toward the first substrate on at least a surface facing the liquid crystal.

According to another aspect of the present invention, in the reflection type liquid crystal display, a switching element for each pixel is further formed on the first substrate, and the switching element is connected to the corresponding electrode out of the plurality of reflective display electrodes.

According to yet another aspect of the present invention, at least a surface of the reflective display electrode facing the liquid crystal is concaved toward the first substrate in the vicinity of a pixel area center.

As described above, since the reflective display electrode is provided with the concavity in each pixel area, the light reflected by the reflective display electrode is converged within the pixel area, so that the light is prevented from being propagated or lost through a light shield area other than the pixel area as an invalid light, or from being emitted from an adjacent pixel area. Therefore, the luminance of the reflected light obtained in each display pixel can substantially be enhanced. Moreover, since the reflected light is emitted from the same pixel area without leaking to adjacent pixels, image blur and the bleeding of a displayed color image can be prevented, so that a display quality can be enhanced.

Furthermore, in the present invention, the second substrate is provided with a light diffusing member, so that the light converged by the concavity of the reflective display electrode can be diffused and emitted. Therefore, the intensity of the emitted light can be uniformed in a single pixel, luminance nonuniformity is prevented and the display quality can further be enhanced.

In still another aspect of the present invention, the concavity of the reflective display electrode may also be obtained by the following constitution.

For example, in the device, at least an insulating film is formed between the reflective display electrode and the first substrate.

A concavity toward the first substrate is formed on the surface of the insulating film facing the liquid crystal for each of the pixel areas. The concavity of the insulating film is continued to the surface of the reflective display electrode facing the liquid crystal, formed on the insulating film.

Moreover, the switching element formed for each pixel and a wire for supplying a signal to the switching element are formed on the first substrate. The plurality of reflective display electrodes are formed on the insulating film which is formed on the whole surface of the substrate so as to cover the switching element and the wire. Each of the plurality of reflective display electrodes is positioned so as to cover rising areas disposed by the provision of the corresponding switching element and/or the wire on the surface of the insulating film and a concaved area held between the rising areas, and irregularities of the surface of the insulating film are continued to the surface of the reflective display electrode facing the liquid crystal.

According to yet another aspect of the present invention, there is provided a reflection type liquid crystal display, which comprises a liquid crystal held in a gap between a first substrate and a second substrate disposed facing each other; and electrodes for driving the liquid crystal disposed on the first and second substrates facing the liquid crystal. The electrode formed on one of the first and second substrates is a reflective display electrode formed of a conductive reflective material, and at least a surface of the reflective display electrode facing the liquid crystal has a concavity toward the substrate in each pixel area.

According to still another aspect of the present invention, there is provided a method of manufacturing a reflection type liquid crystal display provided with a liquid crystal held in a gap between a first substrate and a second substrate disposed facing each other, and electrodes for driving the liquid crystal formed on the first and second substrates facing the liquid crystal, said method comprising the steps of forming a reflective display electrode with a conductive reflective material on the first substrate and of selectively etching the surface of the reflective display electrode to form a concavity toward the first substrate on the surface of the reflective display electrode.

According to still another aspect of the present invention, there is provided a method of manufacturing a reflection type liquid crystal display provided with a liquid crystal held in a gap between a first substrate and a second substrate disposed facing each other, and electrodes for driving the liquid crystal formed on the first and second substrates facing the liquid crystal, said method comprising the steps of forming an insulating film on the first substrate; selectively etching the surface of the insulating film to form a concavity toward the first substrate for each pixel area on the surface of the insulating film; and forming a reflective display electrode with a conductive reflective material on the insulating film.

As described above, according to the present invention, a reflection type liquid crystal display can be obtained, in which the luminance of each display pixel is enhanced, and a bright image can be displayed in a wider viewing angle.

DESCRIPTION OF THE PREFERRED EMBODIMENTS

The reflection type liquid crystal display according to the present invention will be described in the following.

First Embodiment

Figure 1:
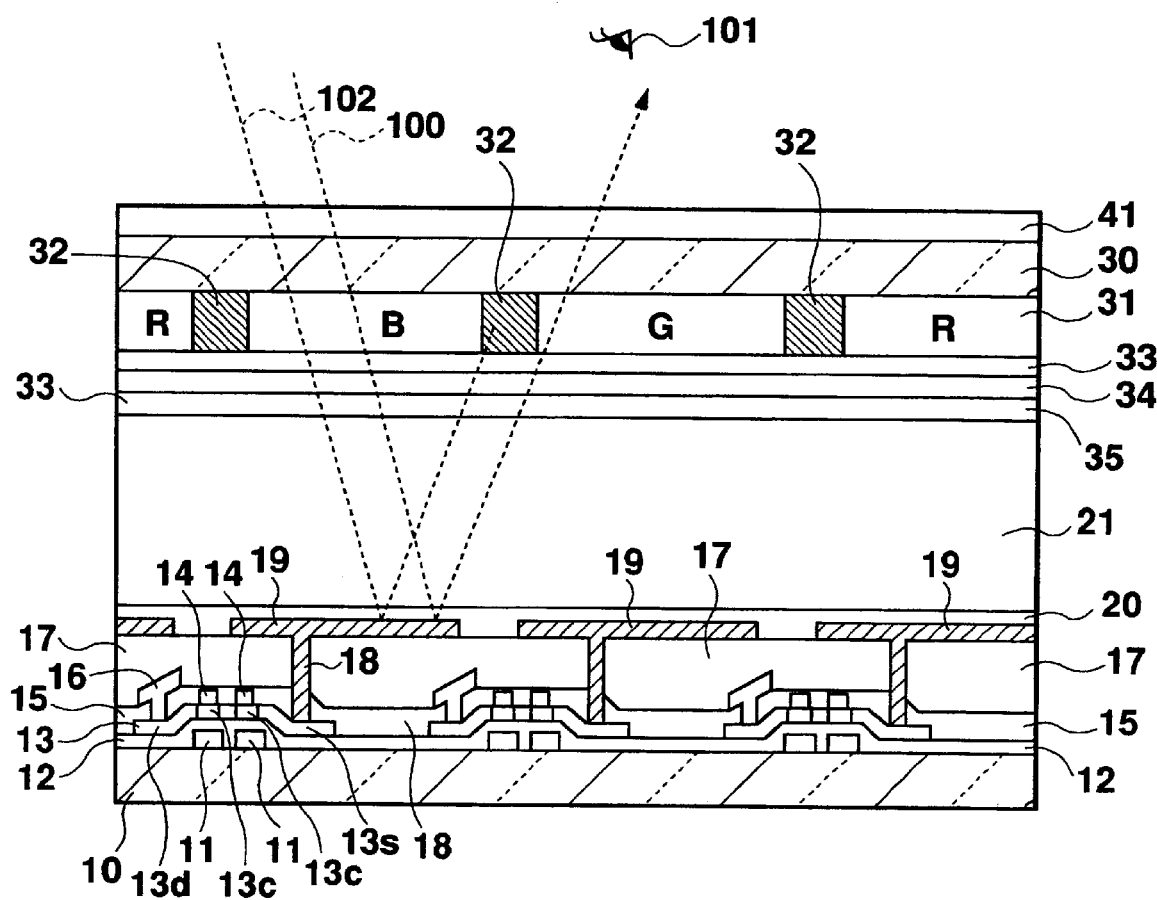
FIG. 1 is a sectional view of a conventional reflection type liquid crystal display.
Figure 2:
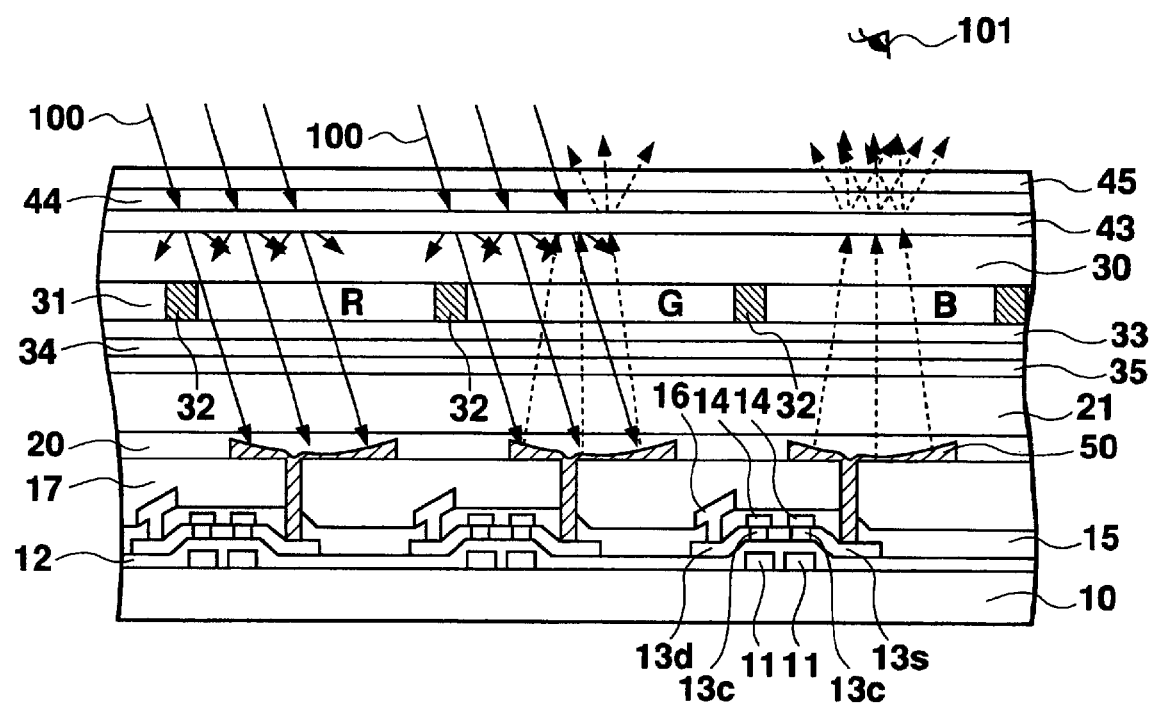
FIG. 2 is a sectional view of a reflection type liquid crystal display according to a first embodiment of the present invention.

FIG. 2 is a sectional view of a first embodiment of the present invention.

As shown in FIG. 2, in the first embodiment, TFT as a switching element is formed on an insulating substrate 10 of quartz glass or non-alkali glass or the like.

Because the structure from the gate electrode 11 of a refractory metal, such as Cr and Mo, up to the planarization insulating film 17 on the insulating substrate 10, is formed as in conventional display units, the description of those components is omitted.

Reflective display electrodes 50, formed of conductive reflective materials, such as Al and silver (Ag) and connected to the sources 13s of the active layer 13 of a polysilicon film, are formed on the planarization insulating film 17. For the surface of the reflective display electrode 50, a substantially central portion of the display electrode has a concave surface curved toward the TFT substrate 10, that is, substantially the central portion of the display electrode has a curved surface being concave in a direction of TFT substrate 10, and further in other words, the substantially central portion of the display electrode is configured to be depressed toward the TFT substrate. Moreover, the alignment film 20 of polyimide or the like for aligning the liquid crystal is formed on the entire surface covering the reflective display electrodes 50. In this connection, the surface of the display electrode above a contact hole is partially covered is more concaved than the other region surface of the display electrode owing to the influence of the presence of the hole.

On the other hand, the counter electrode substrate 30 is, on the side facing the liquid crystal 21, provided with a color filter 31 comprising the primary colors R, G and B and a black matrix with a light shielding function, and a protective film 33 formed of an acrylic resin, for example, to protect the color filter 31. A counter electrode 34 facing the reflective display electrodes 50 is disposed on the whole surface of the protective film 33. Furthermore, an alignment film 35 of polyimide is formed over the entire surface of the counter electrode 34.

On that side of the counter electrode substrate 30 which does not face the liquid crystal, in other words, the viewing side of the display, a diffusing layer 43 to diffuse light, a phase (λ/4) plate 44 and a polarizer 45 are formed in succession.

For the liquid crystal 21, TN liquid crystal can, for example, be used.

The path traveled by light viewed by a user of the above reflection type liquid crystal display is described in the following. In FIG. 2, for convenience of description, the path of incident light is shown in R pixels of the color filter 31, the path of the incident light and a part of reflected light is shown in G pixels, and the path of the reflected light is shown in B pixels. In reality, light 100 is incident on each color as shown by each solid line, and the light reflected by the reflective display electrode 50 advances and emerges as shown by the broken line.

As shown by the solid line with an arrow in FIG. 2, natural light 100 coming from the outside is incident on the polarizer 45 on the side of the observer 101, and passes through the phase plate 44 to reach the diffusing layer 43. The light is diffused by the diffusing layer 43, and the diffused light passes through the counter electrode substrate 30, the color filter 31, the protective film 33, the counter electrode 34, the alignment film 35, the liquid crystal 21, and the alignment film 20 on the TFT substrate 10 to reach the reflective display electrode 50 consisting of the reflective material and having the curved surface. The light is reflected by the reflective display electrode 50.

Here, as shown in FIG. 2, because the vicinity of the center of the reflective display electrode 50 substantially forms a concave curved surface, as shown by the broken line with the arrow in FIG. 2, the light reflected in the vicinity of the peripheral edge of the reflective display electrode 50 travels linearly and in parallel, and passes through each color (R, G, B) of the color filter corresponding to the reflective display electrode 50, without passing through a portion not related with display, such as the black matrix. The reflected light is diffused by the diffusing layer 43, passes through the phase plate 43 and the polarizer 45, and is viewed by the observer 101. It is obvious that the light reflected in the vicinity of the center of the display electrode also travels upward, and is diffused by the diffusing layer 43 and viewed by the observer 101. In this connection, the concaved portion formed on the surface of the reflective display electrode 50 owing to the contact hole as described above also plays a partial role of the function for converging the reflected light in the range in which the reflective display electrode 50 is formed.

The light reflected by the reflective display electrode 50 passes through the liquid crystal 21, the alignment film 35, the counter electrode 34, the protective film 33, the color filter 31, and the counter electrode substrate 30, and is diffused by the diffusing layer 43. The light further passes through the phase plate 44 and the polarizer 45 and enters the eyes of the observer 101.

Additionally, because the diffusing layer 43 is provided, converged light reaching the diffusing layer 43 is diffused in every direction by the diffusing layer 43 and emerges from the phase plate 44 and the polarizer 45. Because of the converging function of the reflective display electrode 50, even when the reflected light from the reflective display electrode 50 fails to reach, for example, the black matrix positioned in the peripheral edge of the pixel, the vicinity of the peripheral edge of the pixel area is prevented from looking dark, so that a bright image can be displayed uniformly over the whole surface.

The luminance measurement of the reflected light of the reflection type liquid crystal display will be described with reference to FIGS. 3A and 3B.

Figure 3A:
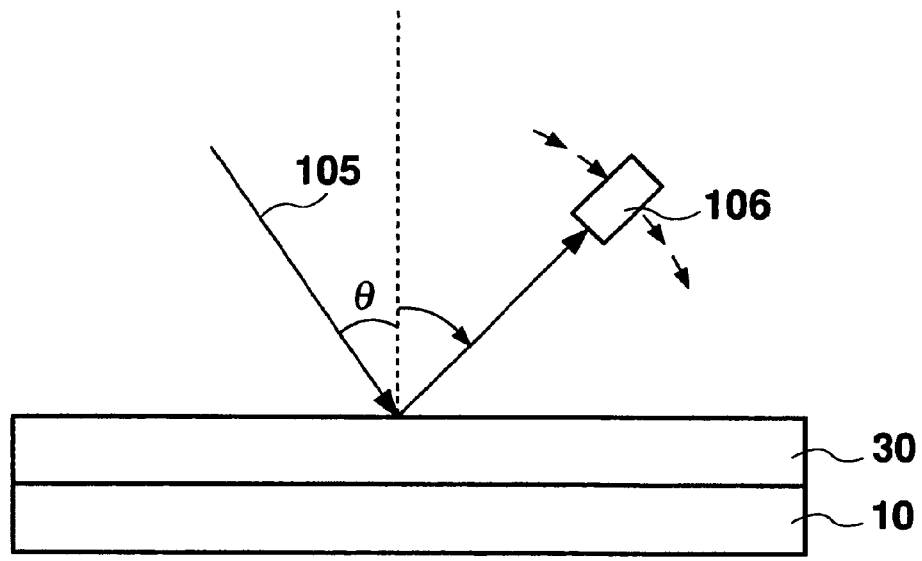
FIG. 3A is a diagram showing a method of measuring a reflected light intensity in the reflection type liquid crystal display of the present invention.
Figure 3B:
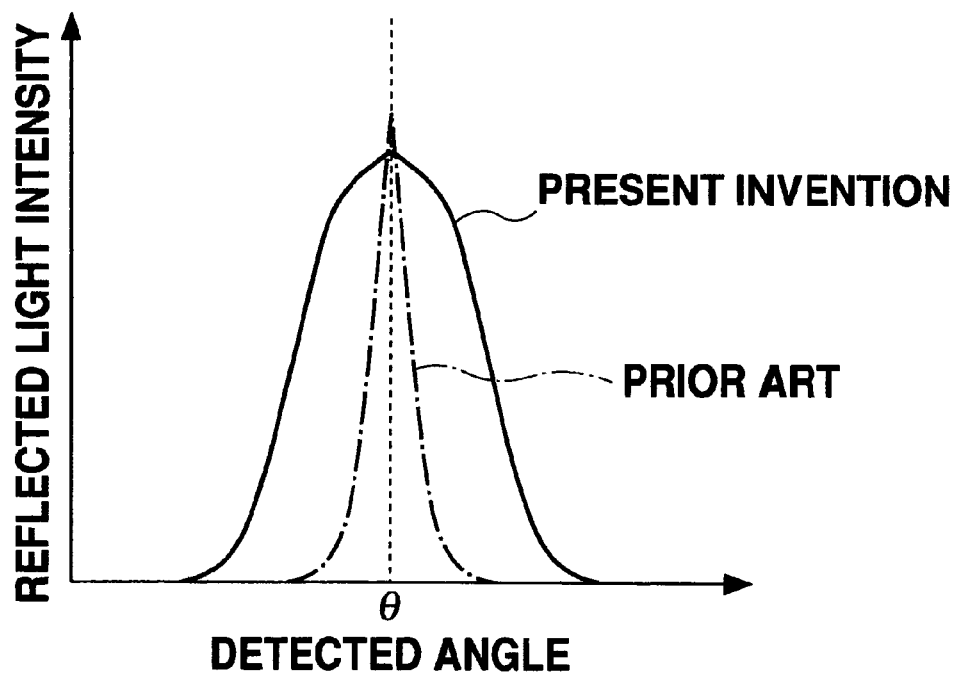
FIG. 3B is a graph showing a relation between a detected angle and the reflected light intensity measured by the method shown in FIG. 3A.

FIG. 3A shows a method of measuring the luminance of the surface of the reflection type liquid crystal display, and FIG. 3B is a graph showing measurement results.

As shown in FIG. 3A, display is performed with a display side (the side of the counter electrode substrate 30) facing upward in a reflection type liquid crystal display panel provided with the TFT substrate 10 and the counter electrode substrate 30. Then, light is allowed to be incident upon the display panel from a direction inclined by a certain angle, for example, θ to a vertical direction to the display surface. An incident light 105 is reflected by the reflective display electrode, and an emerging reflected light in each angle is measured by a light intensity detector 106. The light intensity detector 106 is moved in an arrow direction from a normal line direction (shown by a broken line in FIG. 3A) of the liquid crystal display panel of FIG. 3A, the angle from the normal line direction is changed, and the reflected light in each angle is detected and measured.

The measurement results are shown in FIG. 3B. In FIG. 3B, the axis of abscissa shows the detected angle, and the axis of ordinate shows the reflected light intensity in each detected angle. Moreover, in FIG. 3B a solid curve shows a reflection type liquid crystal display of the present invention, while a broken curve shows a conventional reflection type liquid crystal display. In FIG. 3B, angle θ has an opposite direction from the normal line to the incident angle θ of the incident light 105 in FIG. 3A, and has a size equal to that of the incident angle θ.

As seen from FIG. 3B, in a conventional reflection type liquid crystal display, the reflex light intensity is strong in a specific angle, that is, the incident angle of the incident light, but according to the reflection type liquid crystal display of the present invention, the reflected light emerges out of the display panel in a wide angle of view, so that bright display can be viewed in a wide range of the display panel.

A method of forming the reflective display electrode having a curved surface will next be described.

FIGS. 4A to 4D are manufacture process sectional views of the reflection type liquid crystal display of the present invention.

After TFT is formed on the insulating substrate 10 in a general manufacturing method, the planarization insulating film 17, for example, formed of an organic resin is formed on the entire surface to flatten the surface. Subsequently, a contact hole is formed in a position corresponding to the source 13s of the planarization insulating film 17, and the reflective display electrode 50, which consists of Al in contact with the source 13s through this contact hole and serves also as the source electrode, is formed on the planarization insulating film 17.

Figure 4A:
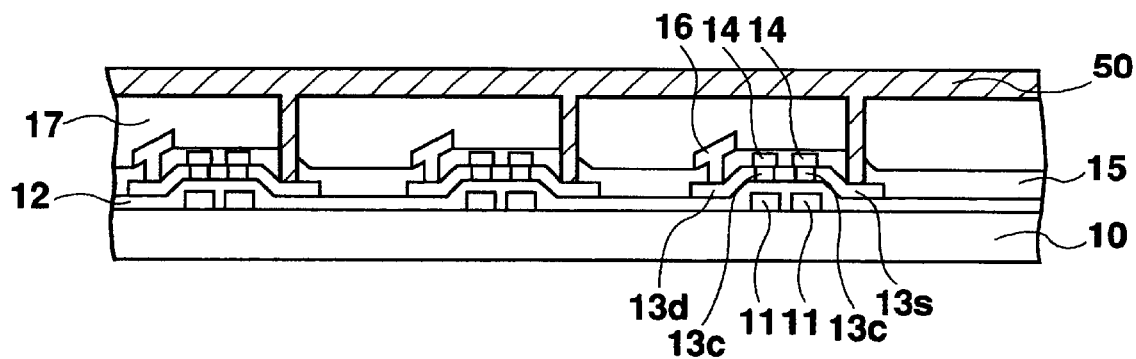
FIGS. 4A, 4B, 4C and 4D are manufacture process diagrams of the reflection type liquid crystal display according to the first embodiment of the present invention.
Figure 4B:
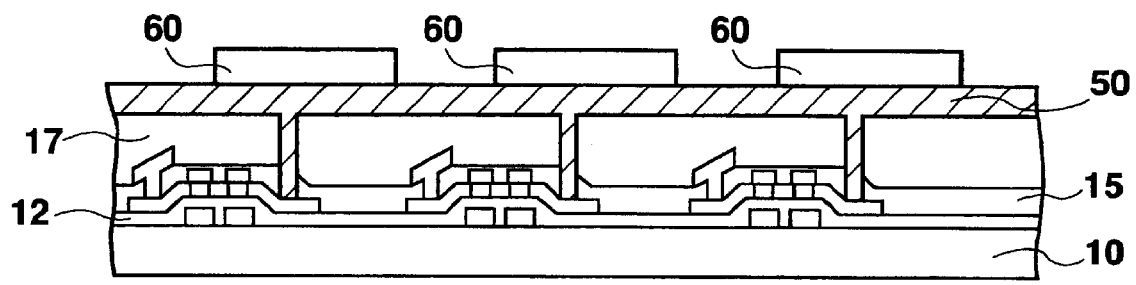
Figure 4C:
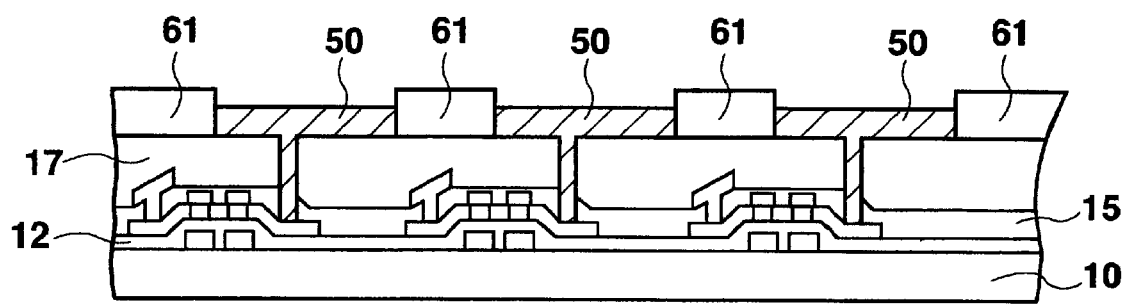
Figure 4D:
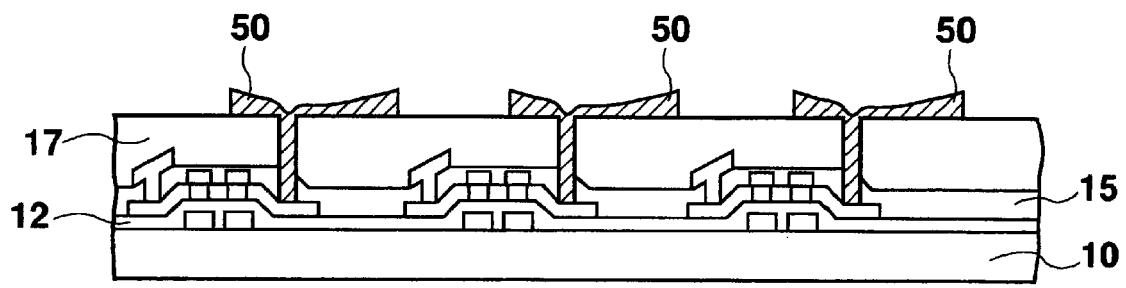

To form the reflective display electrode 50, a conductive reflective material of Al or Ag or the like, which is the material of the reflective display electrode, is first deposited (FIG. 4A). Resist patterns 60 are formed in areas, in which the reflective display electrodes 50 are to be formed and a resist remains (FIG. 4B). After the Al (for example) is etched to form the reflective display electrodes 50, the resist patterns 60 are removed. Thereafter, the areas other than the reflective display electrodes 50 are covered with resist patterns 61 (FIG. 4C). After anisotropic etching is performed by wet etching, the resist patters 61 are removed. In this manner the surface of the reflective display electrode 50 can be provided with a concave curved surface (FIG. 4D). In the subsequent processes, an alignment film is formed on the surface to form the TFT substrate 10.

Moreover, for the resist patterns formed on the reflective display electrodes 50, patterns in which only the substantially central portions of the reflective display electrodes are opened are first formed, and Al is etched. Subsequently, the resist patterns are removed to form new resist patterns having slightly larger openings, and Al is etched. By etching reflective display electrode surfaces in a stepwise manner, the curved surfaces may be formed.

Figure 5A:
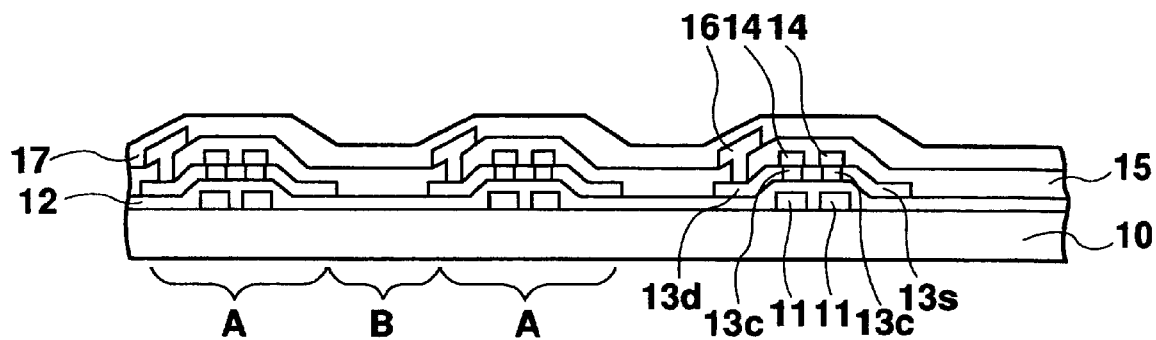
FIGS. 5A and 5B are manufacture process diagrams of the reflection type liquid crystal display according to a second embodiment of the present invention.
Figure 5B:
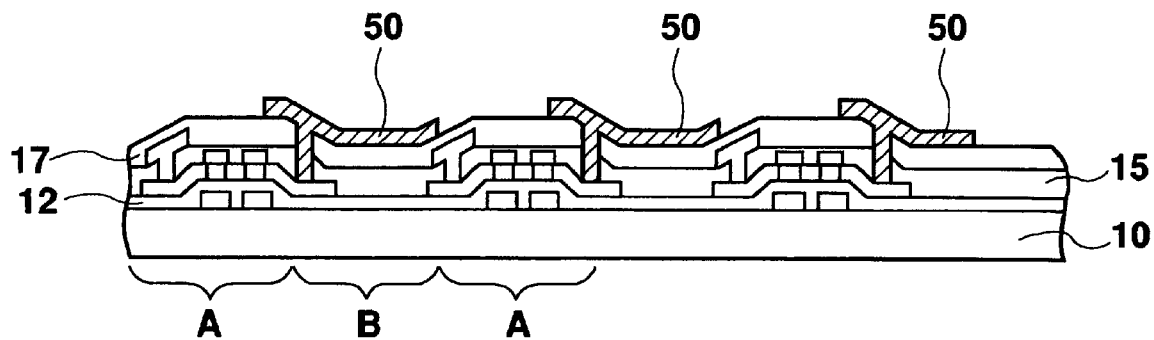

Furthermore, as shown in FIGS. 5A and 5B, the reflective display electrode surfaces may substantially be provided with curved surfaces.

After the drain electrodes 16 are formed as shown in FIG. 5A, the planarization insulating film 17 is applied to the entire surface, for example, by a spinner. Then, the planarization insulating film 17 can be applied to both surfaces of an area A formed by the drain electrodes 16, the gate electrodes 11, and the like, and protruded from a TFT substrate surface, and a substantially flat area B in which the reflective display electrodes are to be formed. Therefore, the surface of the planarization insulating film 17 itself can be formed into a curved surface which is concaved toward the TFT substrate 10 without especially etching the planarization insulating film 17. Subsequently, as shown in FIG. 5B, the contact holes for contacting the reflective display electrodes 50 are made in the planarization insulating film 17 and the inter-layer insulating film 15, the reflective display electrode material is deposited in the contact holes, and the material is molded to form the reflective display electrodes 50. In this manner, the surface of the reflective display electrode can substantially be formed into a curved surface which is concave in the direction of the insulating substrate 10. Additionally, in FIGS. 5A and 5B, to clearly show the conditions of TFT protrusions, the area B between the areas A is shown to be smaller than the area A, but the area B is actually larger because the reflective display electrode is formed in the area.

Second Embodiment

FIGS. 6A to 6D show a second embodiment of the reflection type liquid crystal display of the present invention.

The second embodiment differs from the first embodiment in that, instead of forming the concave curved surface in the reflective display electrode itself, the curved surface is formed in the planarization insulating film 17 disposed under the reflective display electrode 50, so that the reflective display electrode 50 formed on the film substantially has the curved surface.

Figure 6A:
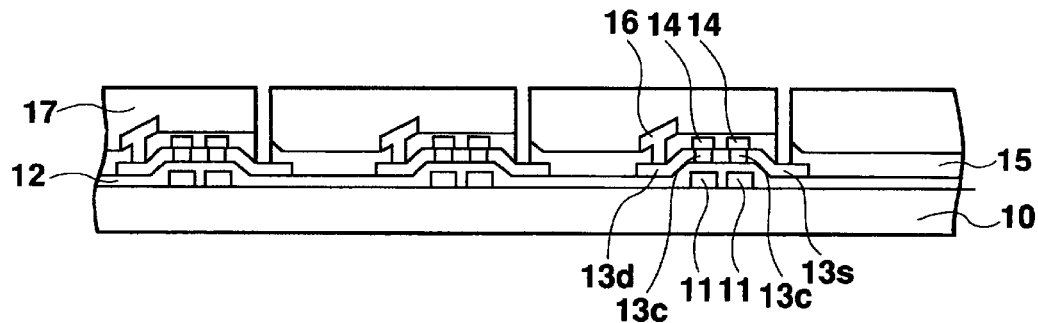
FIGS. 6A, 6B, 6C and 6D are manufacture process diagrams of the reflection type liquid crystal display according to the second embodiment of the present invention.

In the constitution shown in FIG. 6A, because the structure from the gate electrode 11 of a refractory metal, such as Cr and Mo, up to the planarization insulating film 17 on the insulating substrate 10, of quartz glass or non-alkali glass or the like, is formed as in conventional display units, description of these sections is omitted.

Figure 6B:
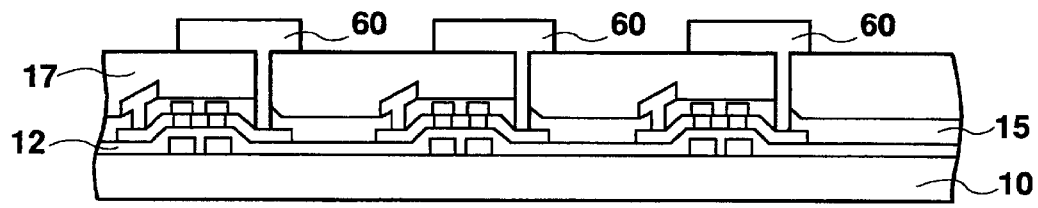
Figure 6C:
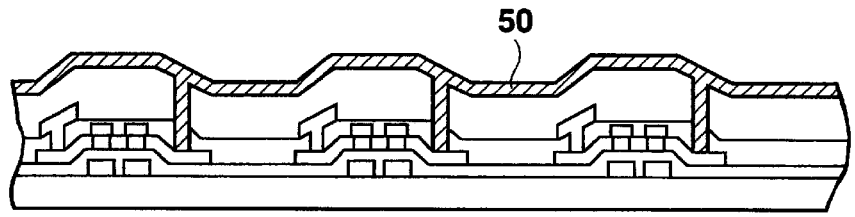

In the second embodiment, as shown in FIG. 6A, contact holes are formed in the formed planarization insulating film 17. Subsequently, as shown in FIG. 6B, resist patterns 60 having openings in the areas in which the reflective display electrodes 50 are to be formed are formed on the planarization insulating film 17. Then, as shown in FIG. 6C, after anisotropic etching is performed on the planarization insulating film 17 by wet etching, the resist patters 60 are removed. In this manner, the planarization insulating film 17 can be provided with a surface which has concave curved surfaces on the side of the insulating substrate 10. For example, a film of Al as the material of the reflective display electrode 50 is formed on the whole surface including the curved surface of the planarization insulating film 17.

Figure 6D:
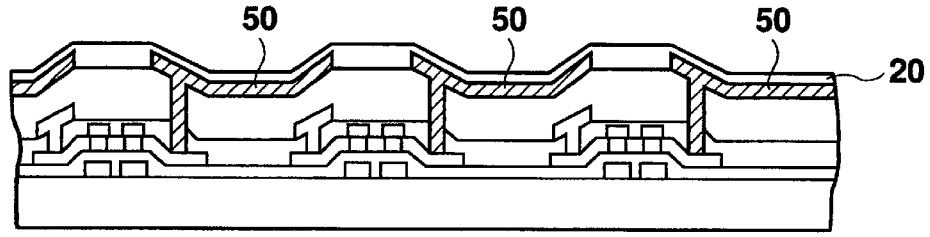

Subsequently, as shown in FIG. 6D, a photolithography process is performed, and the area of the Al film in which the reflective display electrodes are to be formed, is selectively remained, to thereby form the reflective display electrodes 50. Then, since the curved surface is formed on the planarization insulating film 17, the reflective display electrode 50 can substantially be formed into the shape having the curved surface. After the reflective display electrodes 50 are formed, the alignment film 20 of an organic resin such as polyimide for aligning the liquid crystal 21 is formed over the entire surface to complete the TFT substrate 10.

Additionally, in the second embodiment, the contact holes are first formed in the planarization insulating film 17, but as shown in FIG. 6C the contact holes may be made immediately before the reflective display electrode material is applied onto the planarization insulating film 17. In this case, the troublesome step of removing the resist entering the contact hole during the forming of the resist pattern 60 can be omitted.

In the same manner as in the result shown in FIG. 3B, the reflected light intensity of the reflection type liquid crystal display completed as described above is obtained so that a bright display can be viewed over a wide angle of view.

Moreover, when the TFT substrate 10 and the counter electrode substrate 30 are assembled to form an LCD as shown in FIG. 2, and the diffusing layer 43 is formed in the same manner as in the first embodiment, on reaching the diffusing layer 43 the converged light is diffused by the diffusing layer 43 in every direction and emitted from the phase plate 44 and the polarizer 45. Even when the light reflected by the reflective display electrode 50 fails to reach the vicinity of the pixel peripheral edge including the black matrix or the like, the display can be observed uniformly and brightly over the entire surface.

The behavior of the liquid crystal in each embodiment will be described with reference to FIG. 2. In the embodiments, when a voltage is not applied across the liquid crystal, a light entering from the outside is formed into a linearly polarized light by the polarizer 45, formed into a circularly polarized light by the phase plate 44 and is incident on the liquid crystal 21. The light is reflected by the reflective display electrode 50 with its phase changed by $\lambda/2$, passes again through the liquid crystal 21, has its phase changed by $\lambda/4$ by the phase plate 44, is blocked by the polarizer 45 and appears to a viewer to be black.

When a voltage is applied across the liquid crystal, a light entering from the outside is formed into a linearly polarized light by the polarizer 45, and the light is formed into a circularly polarized light by the phase plate 44 and is incident on the liquid crystal 21. The light is then reflected by the reflective display electrode 50 with its phase changed by $\lambda/2$ and passes again through the liquid crystal 21. In this case, the light becomes an elliptic polarized light, has its phase changed by λ/4 by the phase plate 44, is formed into a linearly polarized light by the polarizer 45, and appears to a viewer to be white.

The insulating substrate 10 provided with TFTs fabricated as described above and the counter substrate 30, which faces the substrate 10 and which has the counter electrode 34 and the alignment film 35, are bonded together with their peripheries sealed by a sealing bond 23, thus forming a space inside. Once the space is filled with the liquid crystal 21, the LCD is complete.

Additionally, in the above-described embodiments, the diffusing layer 43 disposed on the opposite side of the counter electrode substrate 30 from the liquid crystal 21, that is, on the external observer's side has been described, but the present invention is not limited to the embodiments. Even when the diffusing layer 43 is disposed on the side of the liquid crystal 21 of the counter electrode substrate 30, for example, between the counter electrode 34 and the protective film 33, the effect of the present invention can be provided.

Moreover, in the embodiments, while polysilicon was described as being used in the active layer of TFT, the present invention is not limited by this description. Even when semiconductor materials such as amorphous silicon, the effect of the present invention can be provided.

Furthermore, in the present invention, in addition to Al, conductive reflective materials such as silver may be used as the reflective display electrode materials.

Figure 7:
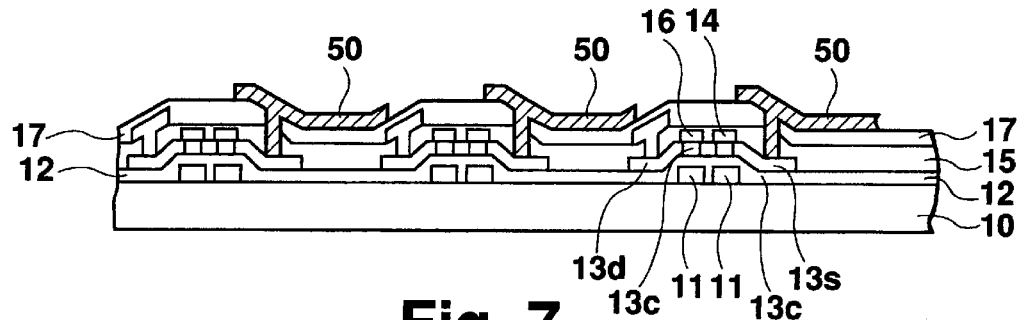
FIG. 7 is a manufacture process diagram of the reflection type liquid crystal display according to the second embodiment of the present invention.

Moreover, in the description of the embodiments, the use of the planarization insulating film as the insulating film under the reflective display electrode has been described, but in the present invention, as shown in FIG. 7, the inter-layer insulating film may be provided with a curved surface in the same method as the method of etching the planarization insulating film to form the concave curved surface in the embodiment. Specifically, the corresponding area in the center of each pixel of the inter-layer insulating film is etched, and the reflective display electrode is formed on the insulating film, so that the surface of the electrode is formed into a curved surface concaved toward the substrate.

What is claimed is:

1. A reflection type liquid crystal display device comprising:
    a liquid crystal held in a gap between a first substrate and a second substrate disposed facing each other; and
    electrodes for driving the liquid crystal for each pixel formed on said first and second substrates facing the liquid crystal, wherein
    the electrode on said first substrate comprises a plurality of reflective display electrodes divided for the pixels and formed on conductive reflective materials, and each of the plurality of reflective display electrodes has a concavity toward the first substrate on at least a surface facing the liquid crystal, said concavity has a flat area at a bottom,
    each of the plurality of reflective display electrodes is formed on a planarization insulating film, said planarization insulating film covers a switching element.

2. The reflection type liquid crystal display according to claim 1, wherein said switching element for each pixel is further formed on said first substrate, and the switching element is connected to the corresponding electrode of said plurality of reflective display electrodes.

3. The reflection type liquid crystal display according to claim 1, wherein at least the surface of said reflective display electrode facing the liquid crystal is concaved toward said first substrate in the vicinity of the center of a pixel area.

4. The reflection type liquid crystal display according to claim 1, wherein
    at least an insulating film is formed between said reflective display electrode and said first substrate,
    the concavity toward said first substrate is formed on the surface of the insulating film facing the liquid crystal for said pixel area, and
    said concavity of the insulating film is continued to the surface of said reflective display electrode facing the liquid crystal, formed on the insulating film.

5. The reflection type liquid crystal display according to claim 1, wherein
    said switching element formed for each pixel and a wire for supplying a signal to the switching element are formed on said first substrate,
    said plurality of reflective display electrodes are formed on an insulating film which is formed on the whole surface of the substrate so as to cover said switching element and said wire,
    each of said plurality of reflective display electrodes is positioned so as to cover rising areas disposed by the provision of said switching element and/or said wire on the insulating film and a concaved area held between the rising areas, and irregularities of the surface of said insulating film are continued to said surface of the reflective display electrode facing the liquid crystal.

6. The reflection type liquid crystal display according to claim 1, wherein said concavity of the surface of the reflective display electrode is provided with a function of converging a light reflected by the reflective display electrode in the corresponding pixel area.

7. The reflection type liquid crystal display according to claim 1, wherein said second substrate is provided with a light diffusing member.

8. The reflection type liquid crystal display according to claim 1, wherein
    said concavity of the surface of the reflective display electrode is provided with a function of converging a light reflected by the reflective display electrode in the corresponding pixel area, and
    said second substrate is provided with a light diffusing member.

9. A reflection type liquid crystal display, comprising:
    a liquid crystal held in a gap between a first substrate and a second substrate disposed facing each other; and
    electrodes for driving the liquid crystal formed on said first and second substrates facing the liquid crystal, wherein
    said electrode formed on one of said first and second substrates is a reflective display electrode formed of a conductive reflective material, and at least a surface of the reflective display electrode facing the liquid crystal has a concavity toward the substrate in each pixel area, said concavity has a flat area at a bottom,
    each of the plurality of reflective display electrodes is formed on a planarization insulating film, said planarization insulating film covers a switching element.

10. The reflection type liquid crystal display according to claim 9, wherein
    at least an insulating film is formed between said reflective display electrode and the substrate on which the reflective display electrode is formed,
    the concavity toward the substrate is formed on the surface of the insulating film facing the liquid crystal for said pixel area, and said concavity of the insulating film is continued to the surface of said reflective display electrode facing the liquid crystal, formed on the insulating film.

11. The reflection type liquid crystal display according to claim 9, wherein said concavity on the surface of the reflective display electrode is provided with a function of converging a light reflected by the reflective display electrode in the corresponding pixel area.

12. The reflection type liquid crystal display according to claim 9, wherein said substrate facing said reflective display electrode via the liquid crystal is provided with a light diffusing member.

13. A method of manufacturing a reflection type liquid crystal display provided with a liquid crystal held in a gap between a first substrate and a second substrate disposed facing each other, and electrodes for driving the liquid crystal formed on said first and second substrates facing the liquid crystal, said method comprising the steps of:

forming a reflective display electrode with a conductive reflective material on said first substrate; and selectively etching the surface of the reflective display electrode to form a concavity toward the first substrate on the surface of the reflective display electrode.

14. A method of manufacturing a reflection type liquid crystal display provided with a liquid crystal held in a gap between a first substrate and a second substrate disposed facing each other, and electrodes for driving the liquid crystal formed on said first and second substrates facing the liquid crystal, said method comprising the steps of:

forming an insulating film on said first substrate;

selectively etching the surface of the insulating film to form a concavity toward said first substrate for each pixel are on the surface of the insulating film; and forming a reflective display electrode with a conductive reflective material on the insulating film.

15. A reflection type liquid crystal display device comprising:

a liquid crystal held in a gap between a first substrate and a second substrate disposed facing each other; and electrodes for driving the liquid crystal for each pixel formed on said first and second substrates facing the liquid crystal, wherein the electrode on said first substrate comprises a reflective display electrode formed on conductive reflective materials, said reflective display electrode has a plurality of concavities toward the first substrate on at least a surface facing the liquid crystal, said each concavity has a flat area at a bottom, each of the plurality of reflective display electrodes is formed on a planarization insulating film, said planarization insulating film covers a switching element.

16. The reflection type liquid crystal display according to claim 15, wherein said switching element for each pixel is further formed on said first substrate, and the switching element is connected to the corresponding electrode of said reflective display electrode.

17. The reflection type liquid crystal display according to claim 15, wherein at least the surface of said reflective display electrode facing the liquid crystal is concaved toward said first substrate in the vicinity of the center of a pixel area.

18. The reflection type liquid crystal display according to any one of claim 15, wherein at least an insulating film is formed between said reflective display electrode and said first substrate, said concavities toward said first substrate are formed on the surface of the insulating film facing the liquid crystal for said pixel area, and said concavities of the insulating film are continued to the surface of said reflective display electrode facing the liquid crystal, formed on the insulating film.

19. The reflection type liquid crystal display according to claim 15, wherein said switching element formed for each pixel and a wire for supplying a signal to the switching element are formed on said first substrate, said reflective display electrode is formed on an insulating film which is formed on the whole surface of the substrate so as to cover said switching element and said wire, said reflective display electrode is positioned so as to cover rising areas disposed by the provision of said switching element and/or said wire on the insulating film and a concaved area held between the rising areas, and irregularities of the surface of said insulating film are continued to said surface of the reflective display electrode facing the liquid crystal.

20. The reflection type liquid crystal display according to claim 15, wherein said concavities of the surface of the reflective display electrode are provided with a function of converging a light reflected by the reflective display electrode in the corresponding pixel area.

21. The reflection type liquid crystal display according to claim 15, wherein said second substrate is provided with a light diffusing member.

22. The reflection type liquid crystal display according to claim 15, wherein said concavities of the surface of the reflective display electrode are provided with a function of converging a light reflected by the reflective display electrode in the corresponding pixel area, and said second substrate is provided with a light diffusing member.

23. The reflection type liquid crystal display according to claim 1, wherein a part of the reflective display electrode is located above the switching element.

24. The reflection type liquid crystal display according to claim 1, wherein a slope of the reflective display electrode is formed using a thickness of the switching element.

25. The reflection type liquid crystal display according to claim 9, wherein a part of the reflective display electrode is located above the switching element.

26. The reflection type liquid crystal display according to claim 9, wherein a slope of the reflective display electrode is formed using a thickness of the switching element.

27. The reflection type liquid crystal display according to claim 15, wherein a part of the reflective display electrode is located above the switching element.

28. The reflection type liquid crystal display according to claim 15, wherein a slope of the reflective display electrode is formed using a thickness of the switching element.

* * * * *

UNITED STATES PATENT AND TRADEMARK OFFICE
CERTIFICATE OF CORRECTION

PATENT NO. : 6,621,540 B2  
DATED : September 16, 2003  
INVENTOR(S) : Noritake et al.

It is certified that error appears in the above-identified patent and that said Letters Patent is hereby corrected as shown below:

Column 7,  
Line 9, delete "patters 61" and insert -- patterns 61 --.

Column 8,  
Line 8, delete "patters 60" and insert -- patterns 60 --.

Column 9,  
Line 55, after "formed" delete "on" and insert -- of --.

Column 11,  
Line 34, delete "are on" and insert -- area on --.  
Line 46, after "formed" delete "on" and insert -- of --.

Signed and Sealed this

Fourth Day of April, 2006

JON W. DUDAS  
*Director of the United States Patent and Trademark Office*